United States Patent

[11] 3,587,627

| [72] | Inventor | Samuel E. Gilmore<br>Houston, Tex. (P. O. Box 265, Bellaire, Tex. 77401) |
|---|---|---|
| [21] | Appl. No. | 840,938 |
| [22] | Filed | July 11, 1969 |
| [45] | Patented | June 28, 1971 |

[54] ADJUSTABLE TOGGLE FLOAT VALVE
10 Claims, 3 Drawing Figs.

[52] U.S. Cl............................................. 137/445, 251/234
[51] Int. Cl.......................................F16k 31/18, F16k 31/44
[50] Field of Search........................................... 137/422, 426, 434, 442, 444, 445; 251/234; 74/102, 105; 73/322.5

[56] References Cited
UNITED STATES PATENTS

| 802,330 | 10/1905 | Schulze.......................... | 137/445X |
| 909,409 | 1/1909 | Herschler...................... | 137/445X |
| 2,571,206 | 10/1951 | Couture......................... | 137/445X |
| 2,833,302 | 5/1958 | Smith............................ | 137/426 |
| 3,324,878 | 6/1967 | Dill................................ | 137/445X |

*Primary Examiner*—Henry T. Klinksiek
*Assistant Examiner*—David R. Matthews
*Attorneys*—Murray Robinson, Ned L. Conley, Robert W. B. Dickerson and Bill B. Berryhill ABSTRACT: Valve closure is pivotally connected to one end of a link forming one bar of a toggle. Other bar of toggle comprises a lever formed by a spring fork. One tine of fork is pivotally connected other end of link providing the knee of the toggle. Another tine of fork is pivotally connected to valve body at a point forming the fulcrum of the lever. The stem of the fork is connected to valve actuation means which may be a float. A setscrew through one end of one tine bears against end of other tine whereby tine spacing can be adjusted so that length of toggle bars just exceeds distance from fulcrum to valve closure when valve is in closed position, giving maximum closing thrust.

PATENTED JUN 28 1971
3,587,627
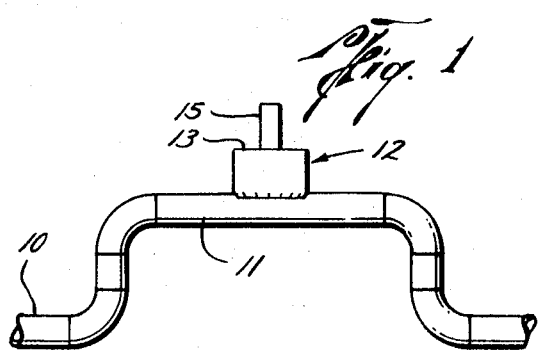
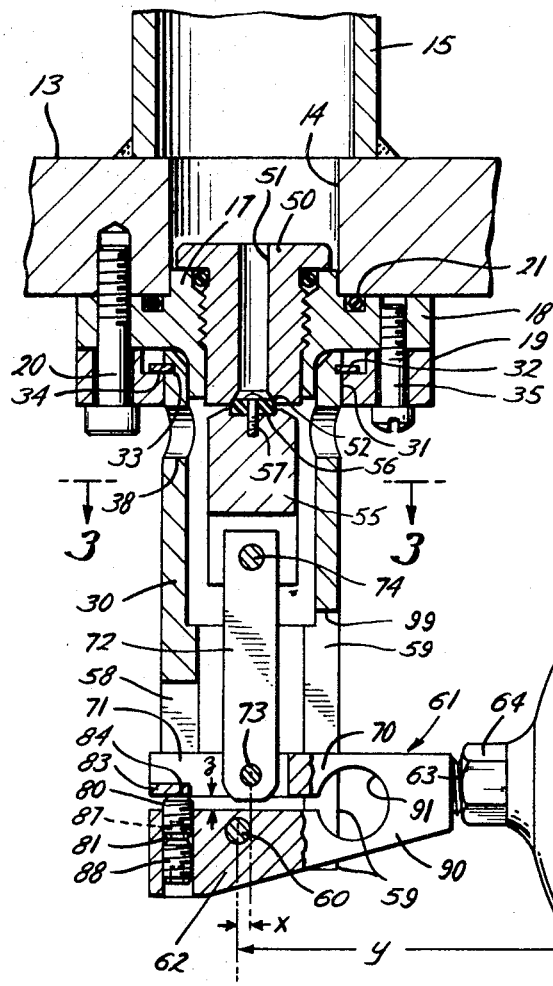
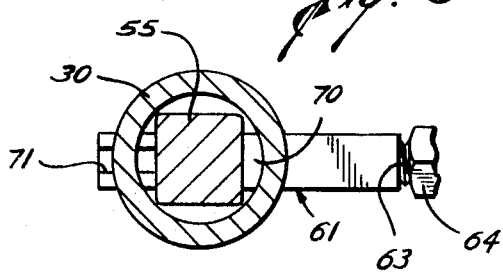
Samuel E. Gilmore
INVENTOR.
BY Murray Robinson
ATTORNEY

ADJUSTABLE TOGGLE FLOAT VALVE

BACKGROUND OF INVENTION

1. Field of Invention

This invention pertains to toggle valves, and more particularly to float actuated air release valves.

2. Description of the Prior Art

A commercial air release float valve for a liquid conveying pipeline must be adapted for operation in a variety of pipeline liquids. If the liquid has a low density the force on the float tending to close the valve will be lower than if the fluid has a high density. If the liquid pressure is high, the float must have a thick wall and the increased float weight reduces the net lifting force of the float. High pipeline pressure also acts to keep the valve closed once it has moved to closed position, opposing the weight of the float when the liquid level drops and the valve should open. All of these factors dictate that the mechanical advantage of the float should be as large as possible to insure that the valve does not leak when closed and that the valve will open promptly when the liquid level falls. A conventional method of achieving this result is by means of a compound lever, e.g. two levers acting in series. However under adverse conditions such as those mentioned above even the mechanical advantage of a system of compound levers is insufficient to avoid leakage. There is a limit to the mechanical advantage obtainable with straight bar levers since the pivot point of the short lever arm cannot be brought closer to the fulcrum than the combined semidiameters of the pivot pins. In addition, as the average system is compounded the friction at the pivot points may become so great as to cause the levers to bind. The result is that many air release valves leak.

SUMMARY OF THE INVENTION

According to the invention the valve closure is pivotally connected to one end of a link forming one bar of a toggle. The other bar of the toggle comprises a lever formed by a spring fork. One tine of the fork is pivotally connected to the other end of the link, providing the knee of the toggle. Another tine of the fork is pivotally connected to the valve body at a point forming the fulcrum of the lever. The stem of the fork is connected to a float or other valve actuation means. A setscrew through one end of one tine bears against the end of the other tine whereby the tine spacing can be adjusted. As manufactured and prior to spreading of the tine with the setscrew, the combined lengths of the toggle bars is less than the maximum fulcrum to valve closure distance, i.e., the distance from the fulcrum to the valve closure where the valve is in closed position. The setscrew is adjusted to spread the tines until the combined length of the toggle bars just exceeds the maximum fulcrum to valve closure distance. Such adjustment provides the maximum mechanical advantage for the float as the valve moves to closed position, for as is well known, the end thrust of a toggle approaches infinity as the bars approach alignment, for any given force at the knee. The present toggle differs somewhat from the conventional toggle in that the force at the knee is not exerted through a member pivotally connected to the knee nor is it exerted perpendicular to the tine of the aligned bars but rather through an extension of one of the bars by a force acting parallel to the line of the aligned bars, but the result is the same as far as mechanical advantage is concerned.

For a more detailed description of a preferred embodiment of the invention reference will now be made to the accompanying drawings, but it is to be understood that this is merely illustrative and not limiting of the scope of the invention.

BRIEF DESCRIPTION OF THE DRAWINGS

FIG. 1 is a schematic view of a pipeline and float chamber in which an air relief valve embodying the invention may be disposed;

FIG. 2 is vertical section through a valve embodying the invention; and

FIG. 3 is a horizontal section taken at plane 3-3 of FIG. 2.

DESCRIPTION OF PREFERRED EMBODIMENT

Referring now to FIG. 1 there is shown a pipeline 10 in which there is connected an elevated section 11 which communicates at its upper surface with a float chamber 12.

Referring to FIG. 2 there is shown a fragment of the upper wall 13 of the float chamber. There is an outlet port 14 in wall 13. Over the top of and around port 14 is guard cap or pipe 15. Underneath the wall 13 adjacent port 14 is secured the float valve of the present invention. The valve includes a body comprising a tubular base member 17 received snugly in port 14. Base member 17 has a peripheral external flange 18 which is secured to wall 13 by retainer ring 19 and a plurality of circumferentially disposed screws such as 20 and is sealed to wall 13 by O-ring 21. The valve body further comprises a tube 30 fitting inside aperture 31 in retainer ring 19 and telescoped over the lower end of tubular base member 17 and bearing against flange 18. The sleeve is retained in position by split lockring 32 spanning a groove 33 in the outer periphery of the sleeve and a counterbore 34 in ring 19. The ring 19 is secured to the base member 17 by a plurality of circumferentially disposed screws such as 35. A plurality of ports 38 in tube 30 provide for entrance to the valve body of fluid exterior thereto.

The valve body further includes a replaceable valve seat plug 50, having an outlet orifice 51, screwed into base member 18. Plug 50 has a conical valve seat 52 at the lower end of orifice 51. Axially slidably disposed in and guided by valve body tube 30 is rectangular cross section valve closure 55 (see also FIG. 3). A replaceable seal ring 56 cooperating with valve seat 52 and having a seating surface correlative thereto is secured to valve closure 55 by screw 57.

The lower end of valve body tube 30 is diametrically slotted at 58, 59. Extending across the lower end of the tube is a fulcrum pin 60. A lever comprising spring fork 61 is received in slots 58, 59. One tine 62 of the spring fork is rotatably mounted on pin 60. To threaded stem 63 of the spring fork is screwed boss 64 of a hollow ball or float 65.

The other tine 70 of the spring fork is slotted at 71 and receives the lower end of link 72 which is pivotally connected to tine 70 by pin 73. The upper end of link 72 is pivotally connected to valve closure 55 by a pin 74.

The link 72 forms one bar of a toggle. The other bar of the toggle is formed by the lever comprising the spring fork. The knee of the toggle is formed by pin 73.

A generally cylindrical, externally threaded setscrew 80 is screwed through generally cylindrical internally threaded bore 81 in tine 62 into engagement with tine 70. The slot 71 does not extend vertically all the way through tine 70 at the extreme end of the tine leaving a web 83 extending across the bottom of the slot. The lower surface 84 of web 83 provides a pad to be engaged by the upper end of setscrew 80. The upper end of screw 80 may be dished to cause it to contact tine pad 84 over an annular area only, thereby avoiding a point contact. The lower end of setscrew 80 is provided with a wrench socket 87 to receive the end of an Allen wrench through bore 81. A lock screw 88, of the same construction as setscrew 80, is screwed into bore 81 below setscrew 80.

The particular shape of the spring fork 61 is worthy of note. The tines 62, 70 and the base 90 of the fork are of rectangular cross section taken on planes perpendicular to the lengths of the tines. The base 90 has a cylindrical fillet 91 between the tines at the roots thereof. The lower tine is of increasing cross-sectional area progressing from root to tip so that it is large enough at its tip to accommodate the setscrew and lock screw. The material used for the spring fork is preferably steel, as is the material for the rest of the valve, except for the seal ring 56 which preferably is made of a plastics material such as Teflon or an elastomeric material such as Neoprene.

Of particular importance to the present invention is the geometry of the spring fork. The adjacent flat sides of tines 62, 70 are preferably parallel in their unstressed condition. The axis of pin 73 by which the tine 70 is connected to link 72 and the rest of the valve means (closure 55, seal ring 56 and screw 57) is only slightly, e.g. distance $x$, to the right of the vertical line through the axis of fulcrum pin 60. Distance $x$ is small compared to the distance $y$ between the axis of pin 60 and a vertical line through the center 90 of the float. Therefore at all times the float has a considerable mechanical advantage in raising and lowering the link 72 between open and closed positions.

In addition however, as the float rises and the valve moves toward closed position, the horizontal component of distance $x$, the effective length of the valve closure lever arm, will shorten more rapidly than the horizontal component of distance $y$, the effective length of the valve actuator lever arm (the force on the float remaining vertical at all times). This is due to the fact that the valve means pivot pin 73 is considerably above the level from fulcrum 60 to the center 90 of the float. The distance $x$ varies as the sine of the angle between vertical and the line from fulcrum 60 and pin 73. Since the angle is small, the variation is almost directly proportional. On the other hand the distance $y$ varies as the sine of the angle between vertical and the line from fulcrum 60 to float center 90. Since the latter angle is near to 90°, the variation is small. The mechanical advantage of the float therefore increases rapidly as the valve approaches closed position. Otherwise expressed, as toggle 61, 72 straightens out, the valve seat reaction required to balance the float force approaches infinity.

The tines of the fork and the stem 63 are all in the same general plane as the center 90 of the float so that there are no eccentric forces or torques imposed on the pins 60 and 73.

When the valve is in use, the float 90 will rise and fall according to the liquid level in float chamber 12. If there is no air in the chamber, the pipeline liquid will fill the chamber and the float will rise as high as it can causing the line 72 to move the valve closure 55 toward seat 52 to close the valve. The float will not contact the top wall 13 of the float chamber nor be restrained by any other stop means so that the full force acting on the float, multiplied by the mechanical advantage $y/x$, will act to close the valve.

Although the spring fork has been described as used to form an adjustable length bar for a toggle, if the pin 73 were moved down close to the line from fulcrum 60 to float center 90, thereby eliminating most of the toggle effect, the spring fork could be used to adjust the initial (and now fairly constant) valve of $x$. In this regard it is to be noted that as the distance $z$ between the tines is increased, the upper tine rotates away from the lower tine about a center near the roots of the tines, thereby increasing the distance $x$ and reducing the mechanical advantage. The mechanical advantage could be increased by reducing the distance $x$. This would be accomplished simply by retracting setscrew 80, which allows the tines 70, 62 to move closer together. As the tines close, pivoting about their juncture at fillet 91, the pivot pin 73 moves to the left relative to pivot pin 60, thereby reducing the distance $x$. The amount of reduction in distance $x$ for any given change in the spacing $z$ between the tines will be smaller the greater the distance of the pins 60 and 73 from fillet 91.

Although the described embodiment of the invention makes use of a spring fork to achieve toggle or lever length adjustment, if the float were limited in its travel by means other than the valve closure, e.g. by engagement of tine 70 with the top 99 of slot 59, then the adjustment of the spring fork could be used to adjust the stroke of the valve closure, that is, the vertical position of the float, for separation and approach of the tines not only increases and decreases the distance $z$ but elevates and lowers the link 72. Thus, the valve could be adjusted so that with the float in the upper limit of its travel, the valve would be closed. The valve would then stay closed until the liquid in the chamber 12 falls enough to cause the float to fall.

It is to be noted that by virtue of the use of a spring fork, both tines 62, 70 bend relative to base 90 upon extension of setscrew 80. However if desired one tine could be made relatively rigid compared to the other so that all of the bending movement takes place in the other or relatively flexible tine.

Finally, instead of using the resilience of the tine material to cause approach of the tines, the setscrew 80 could be connected at one end to tine 70 so as to positively retract it, and tine 70 could then be pivotally connected to base 90 by a pin and bearing or other nonresilient hinge. However the spring fork construction is believed to be superior to such alternatives in ease of manufacture and reliability of operation.

It is also to be noted that although the invention is particularly well adapted for use in an air release valve actuated by a float, it is also applicable to other types of valves actuated by other means, e.g. in electric solenoid actuated valves.

It is further to be noted that fork 59 provides a lever of the second class. By moving pin 73 to the left of pin 60, the fork would be converted to a lever of the first class in which the direction of motion of the valve closure becomes opposite to that of the float, whereby the valve could be adapted to uses wherein it is desired that rising liquid in the chamber open the valve, as in a liquid level controller.

To distinguish the toggle action of the subject valve from that of a simple lever, it may be stated that in the closed position of the valve the angle formed by the line joining the pivot pins 74, 73 and the line joining the pivot pins 73, 60 is within less than 30° of being a straight angle. Actually as shown in FIG. 2, the angle is about 15° less than a straight angle, and in actual practice the angle may approach a straight angle as close as desired. Also it is to be noted that the lever arm 61 is within a few degrees, i.e. less than 15°, of being horizontal or at a right angle to the line of motion of the valve closure when the valve is closed, giving a maximum effectiveness to the float.

I claim:
1. A valve comprising a hollow body having an inlet and outlet,
   a valve seat around the outlet,
   valve closure means adapted to move into engagement with said seat to close the valve and move away from the seat to open the valve,
   a link pivotally connected at one part to the valve closure,
   a spring fork having one tine pivotally connected to said body and another tine pivotally connected to another part of said link, the stem of the fork being connected to valve actuating means, and
   means to vary the spacing of said tines.
2. Valve according to claim 1 including means to guide the valve closure in its movement toward and away from said seat and in which the pivotal connections of the tines to said body and link are spaced apart in a direction along the lengths of the tines transversed to the direction of movement of the valve closure.
3. Valve according to claim 2 in which said spacing of the pivotal connections places said stem of the fork and said pivotal connection of the fork to the link on the same side of said pivotal connection to the body.
4. Valve according to claim 3 in which said means to vary the spacing of the tines is on the other side of said pivotal connection to the body from said stem with respect to the length of said tines.
5. Valve according to claim 4 in which said means to vary the spacing of the tines comprises a setscrew threaded through an aperture in one tine and engaging the other tine.
6. Valve according to claim 5 including a lock screw in said aperture behind said setscrew.
7. Valve according to claim 6 wherein said fork has a cylindrical fillet between the tines adjacent their roots.
8. A valve comprising a hollow body having an inlet and an outlet,
   closure means selectively to block and open passage between said inlet and outlet,
   actuation means to move said closure means,
   lever means connecting said actuating means to said closure means, and
   means to adjust mechanical advantage of the lever means, the lever means including a fork having one tine connected to the closure means and one tine connected to the valve body, the valve stem being connected to said actuating means, said means to adjust the mechanical advantage varying the separation of said tines.

9. A valve comprising a hollow body having an inlet and an outlet, a valve seat around the outlet, valve closure means adapted to move into engagement with said seat to close the valve and move away from the seat to open the valve, valve actuation means comprising a float, a toggle including a link and a lever pivotally connected together to form the knee of the toggle, a portion of the link at a distance from the knee being pivotally connected to the valve closure and a portion of the lever at a distance from the knee being pivotally connected to the valve body to form a fulcrum, said lever being connected to said float at a distance from the fulcrum greater than said knee, the angle formed by the fulcrum, knee, and pivotal connection to the valve means being less than 30° from a straight angle when the valve is closed.

10. Valve according to claim 9 in which when the valve is closed the line from the fulcrum to the center of the float is within 15° of being at a right angle to the line of motion of the valve closure toward its seat.